(12) United States Patent
Hawkins

(10) Patent No.: US 7,158,823 B2
(45) Date of Patent: Jan. 2, 2007

(54) LIMITED-ANGLE FREQUENCY-DISTANCE RESOLUTION RECOVERY IN NUCLEAR MEDICINE IMAGING

(75) Inventor: William G. Hawkins, Shaker Heights, OH (US)

(73) Assignee: Koninklijke Philips Electroncis N.V., Eindhoven (NL)

( * ) Notice: Subject to any disclaimer, the term of this patent is extended or adjusted under 35 U.S.C. 154(b) by 1051 days.

(21) Appl. No.: 09/782,331

(22) Filed: Feb. 13, 2001

(65) Prior Publication Data

US 2004/0073109 A1  Apr. 15, 2004

(51) Int. Cl.
*A61B 6/00* (2006.01)
(52) U.S. Cl. .................................. 600/436
(58) Field of Classification Search ........... 600/436, 600/407, 410; 250/363.037–7, 363.67
See application file for complete search history.

(56) References Cited

U.S. PATENT DOCUMENTS

| 5,481,115 A * | 1/1996 | Hsieh et al. ............. 250/363.04 |
| 5,633,499 A * | 5/1997 | Lim et al. ............... 250/363.07 |
| 5,722,405 A * | 3/1998 | Goldberg ..................... 600/407 |
| 6,171,243 B1 * | 1/2001 | Gagnon et al. ............. 600/431 |
| 6,239,438 B1 * | 5/2001 | Schubert ................. 250/363.03 |
| 6,577,890 B1 * | 6/2003 | Hayes et al. ................. 600/436 |

OTHER PUBLICATIONS

Xia, et al., "Fourier Correction for Spatially Variant Collimator Blurring in SPECT", IEEE Trans. on Med. Imaging, V. 14, No. 1, Mar. 1995 p. 100-115 XP002204703.
Sasaki, "A New Flexible 2D-Image Reconstruction in Computed Tomography Based on Non-Uniform Sampling Theorem for Spatially Band-Limited Signals" Multisensor Fusion & Integration For Intelligent Systems, 1999 MFI '99 Proceedings 1999 IEEE/SICE/RSJ Int'l Conference on Taipei, Taiwan Aug. 15-19, 1999 Piscataway, NJ IEEE US Aug. 15, 1999 pp. 50-55 XP010366557.
Glick, et al. "Noniterative Compensation for the Distance-Dependent Detector Response and Photon Attenuation in SPECT Imaging", IEEE Transactions on Medical Imaging, vol. 13, No. 2, Jun. 1994.
Hawkins, et al. "An Intrisic 3D Wiener Filter For the Deconvolution of Spatially Varying Collimator Blur", 1994 IEEE pp. 163-167.
Xia, et al., "Fourier Correction for Spatially Variant Collimator Blurring in SPECT", IEEE Transactions on Medical Imaging, vol. 14, No. 1, Mar. 1995.
Lewitt, et al., "Fourier Method for the Correction of Depth-Dependent Blurring in Medical Imaging III: Image Processing", vol. 1092, pp. 232-243 Proc. SPIE, 1989.
Glick, et al., "Filtering of SPECT Reconstructions Made Using Bellini's Attenuation Correction Method: A Comparison of Three Pre-Reconstruction Filters and a Post-Reconstruction Wiener Filter", IEEE Trans Nucl S 38;2:663-669.

* cited by examiner

*Primary Examiner*—Daniel Robinson
(74) *Attorney, Agent, or Firm*—Fay, Sharpe, Fagan, Minnich & McKee

(57) ABSTRACT

A nuclear camera (10) includes a plurality of detector heads (12) which have collimators (14) for fixing the trajectory along which radiation is receivable. A rotating gantry (22) rotates the detector heads around the subject collecting less than 360° of data, e.g., 204° of data. A zero-filling processor (50) generates zero-filled projection views such that the actually collected projection views and the zero-filled projection views span 360°. A smoothing processor (56) smooths an interface between the zero-filled and actually collected projection views. The zero-filled and smoothed views are Fourier transformed (60) into frequency space, filtered with a stationary deconvolution function (62), and Fourier transformed (64) back into real space. The resolution recovered projection data sets in real space are reconstructed by a reconstruction processor (68) into a three-dimensional image representation for storage in an image memory (70).

24 Claims, 3 Drawing Sheets

LIMITED-ANGLE FREQUENCY-DISTANCE RESOLUTION RECOVERY IN NUCLEAR MEDICINE IMAGING

BACKGROUND OF THE INVENTION

The present invention relates to the diagnostic imaging art. It finds particular application in conjunction with nuclear single photon emission computed tomography (SPECT) medical imaging and will be described with particular reference thereto. However, the invention will also find application in conjunction with other types of non-invasive diagnostic imaging.

Heretofore, diagnostic images have been generated from single and multiple-head nuclear cameras. Typically, a patient positioned in an examination region is injected with a radio pharmaceutical. Heads of the nuclear camera are positioned closely adjacent to the patient to monitor the radio pharmaceutical. Typically, the heads are stepped in increments of a few degrees around the patient until 360° of data have been acquired. That is, projection data along directions spanning 360° are collected. With multiple-head systems, projections along each direction need only be collected with one of the heads and be assembled into a complete data set.

Each detector head carries a collimator which defines a path along which it can receive radiation. However, due to the finite length and dimensions of the collimator, each incremental area of the detector head actually views an expanding cone. Thus, with increasing depth into the patient away from the detector head, the region from which a sensed radiation event originated expands. This creates depth-dependent blurring and uncertainty in the resultant image data. This error is a non-stationary convolution which is difficult to deconvolve. However, when the patient is viewed over a full 360°, the angular data sets are periodic in $2\pi$ radians. By transforming the full data sets into the frequency domain with a Fourier transform fit to the sampling intervals, the non-stationary deconvolution is reduced to a stationary deconvolution problem, particularly for high frequencies.

Although these prior art resolution recovery techniques work well on full data sets, cardiac imaging is typically done using an incomplete data set. More specifically, in a three-head camera system where only two heads collect the emission data while the third head is used to collect transmission data, the gantry is rotated by about 102° to generate the equivalent of only about 204° of emission data. The prior art resolution recovery techniques do not work on partial data sets whose data is not periodic in $2\pi$ radians.

The present invention contemplates a new and improved method and apparatus which overcomes the above-referenced problems and others.

SUMMARY OF THE INVENTION

In accordance with one aspect of the present invention, a method of diagnostic imaging is disclosed. A plurality of projection data sets are collected at each of a plurality of angles around a subject. The projection images are collected over less than 360°. A resolution recovery process is performed on the projection data sets. The resolution recovered projection data sets are reconstructed into an image representation.

In accordance with another aspect of the present invention, a method of diagnostic imaging is disclosed. A gantry moves a detector head in a continuous angular orbit about a subject in an examination region. Data is collected during the continuous orbit and sorted into a plurality of projection data sets corresponding to each of a plurality of angular increments around a subject. A resolution recovery process is performed on the projection data sets. The resolution recovered projection data sets are reconstructed into an image representation.

In accordance with yet another aspect of the present invention, a diagnostic imaging apparatus is disclosed. At least one detector head detects incident radiation. A collimator mounted to the detector head limits trajectories along which radiation is receivable by the head. A movable gantry moves the detector head around a subject in an examination region. A data acquisition system acquires projection data sets from the detector head at angular increments spanning less than 360°. A zero-filling processor generates zero-filled data sets between the actually collected projection data sets, to create 360° of data sets. A smoothing processor smooths interfaces between the actually collected and zero-filled data sets. A resolution recovery processor operates on the smoothed data sets. A reconstruction processor reconstructs the resolution recovered data sets into a three-dimensional image representation. An image memory stores the three-dimensional image representation.

One advantage of the present invention is that it accurately restores limited-angle data sets.

Another advantage of the present invention is that it restores continuously scanned data sets.

Another advantage of the present invention is that it processes image data in a clinically feasible time.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
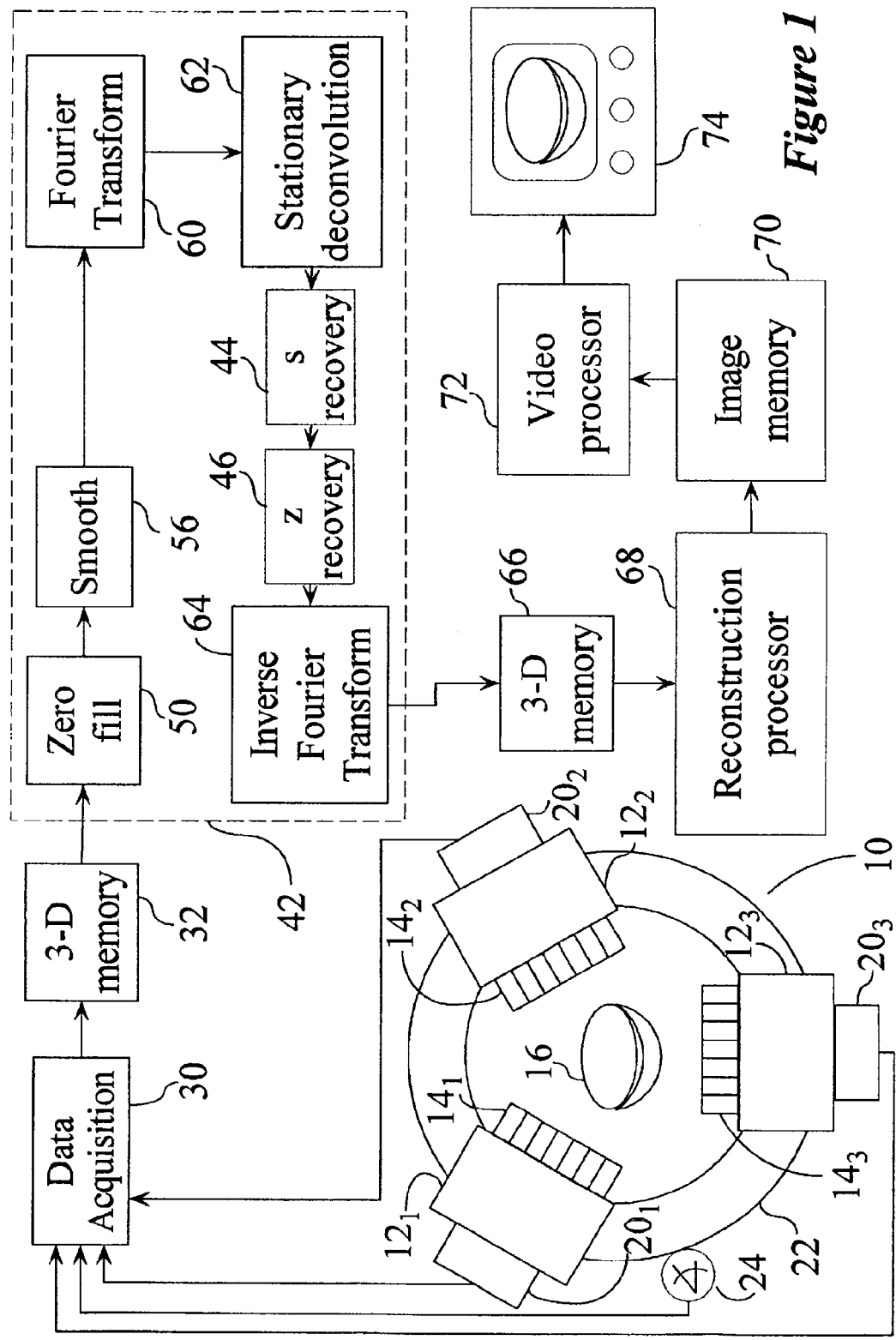
FIG. 1 is a diagrammatic illustration of a nuclear medicine imaging system in accordance with the present invention.

With reference to FIG. 1, a nuclear camera system 10 includes a plurality of detector heads 12, in the preferred embodiment three detector heads 12$_1$, 12$_2$, and 12$_3$. Two of the three heads are typically used to obtain emission data, while the third head is used to obtain transmission data. Of course, other numbers of detector heads can also be utilized. Each of the detector heads includes a collimator 14$_1$, 14$_2$, and 14$_3$. In the preferred embodiment, the collimators collimate incoming radiation from a subject 16 to parallel rays. However, because the collimators have finite size, each collimator permits rays which lie along a corresponding cone to pass to the detector head. The cone expands with depth into the patient from the detector head.

Each of the detector heads includes a reconstruction system 20$_1$, 20$_2$, and 20$_3$ which determines the coordinates on a face of the detector head in the longitudinal or z-direction of the patient and the transverse direction across the detector head. With the detector head in a single orientation, scintillation events are collected for a preselected period of time to generate a projection image representation. After the preselected data acquisition duration, a rotating gantry 22 rotates all three detector heads concurrently a short angular distance, e.g., 3°. In the new location, each of the detector heads collects another projection image. An angular orientation monitor 24 determines the angular orientation of each of the heads at each angular data collection position.

A data acquisition system 30 receives each of the projection images and an indication of the angle along which it had been taken. This data is stored in a three-dimensional memory 32 in longitudinal (z), lateral (s), and angular ($\phi$) coordinates.

Figure 2:
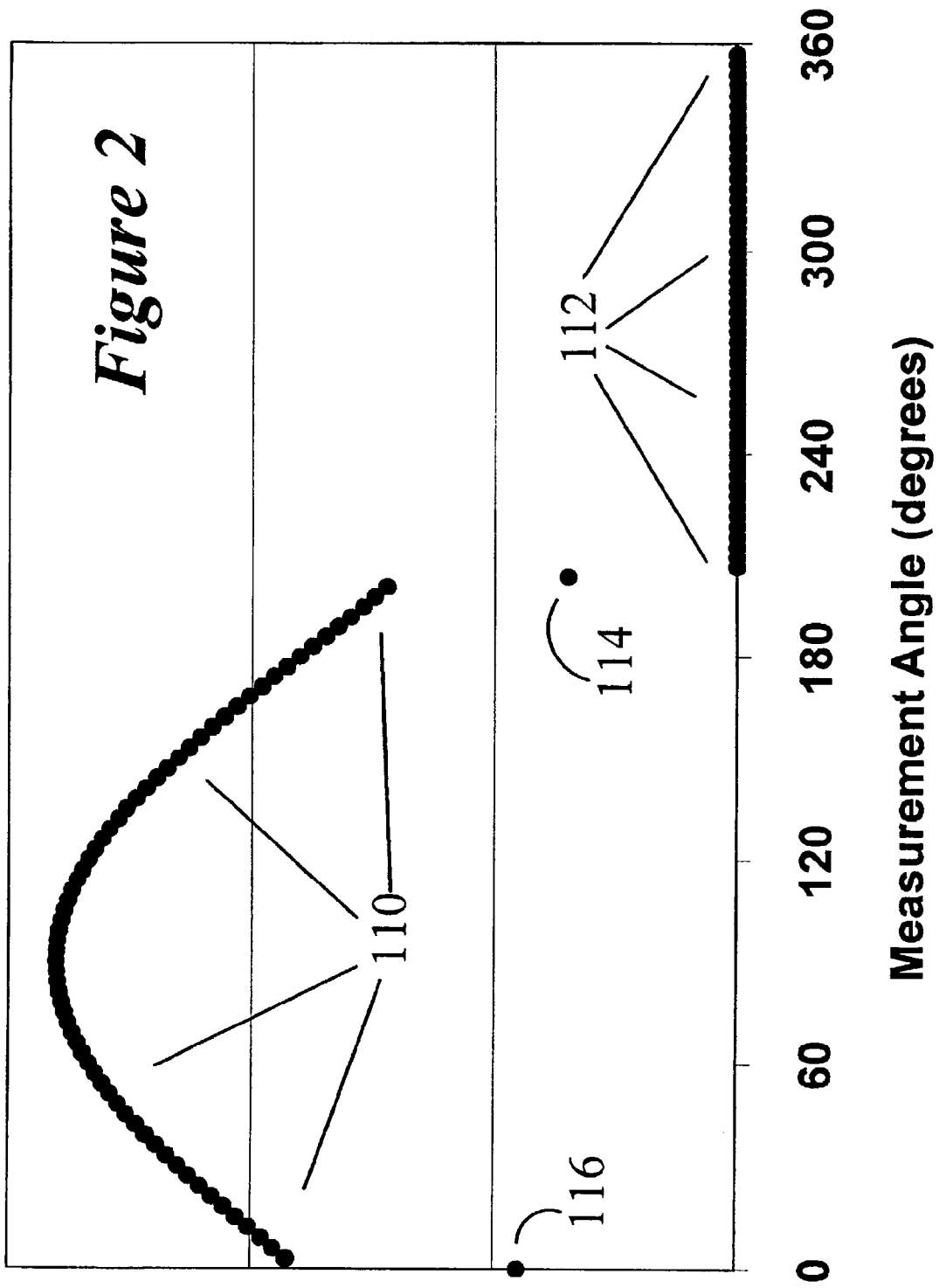
FIG. 2 is a diagrammatic illustration of the formation of the modified data set which is periodic in $2\pi$ radians, based on the non-periodic limited-angle data set.

With continuing reference to FIG. 1 and further reference to FIG. 2, the rotating gantry 22 rotates the detector heads over 102° for cardiac imaging. Rotation over 102° generates the equivalent of about 204° of emission data 110 collected by two camera heads. Each data set is collected at equal angular increments, e.g., 3°. FIG. 2 shows an incomplete data set with no data collected between 204° and 360° in the angular dimension. Simultaneously, the third camera collects transmission data over the 102° gantry rotation.

With continuing reference to FIG. 2 and reference again to FIG. 1, a resolution recovery system 42 includes an angular displacement dimension resolution recovery system and optionally includes resolution enhancement sub-system 46 for the axial dimension. The resolution recovery system in the angular direction ($\phi$) has a zero-filling processor 50 which creates zero magnitude projection data sets 112 at each of the 3° intervals between 204° and 360°. In this manner, a function which is periodic in $2\pi$ radians is created. In order to prevent Gibbs' ringing, the sudden discontinuities at each end of the actually collected data 110 between the actually collected and zero-filled data 112 are smoothed by a smoothing processor 56. In the preferred embodiment, the magnitude of the end points are each cut in half producing modified data points 114 and 116. Optionally, other smoothing functions which span several points at each end are also contemplated.

A Fourier transform processor 60 transforms the data into the frequency domain. The Fourier transform is selected to match all of the sampling points including the zero-filled points in the angular dimension. A stationary deconvolution processor 62 operates on the frequency-spaced data. In frequency space, the deconvolution problem reduces to a stationary deconvolution problem, particularly for high frequencies. Because high frequencies correspond to fine detail, it is the high frequencies which correspond to the resolution to be optimized. The additional deconvolution 46 may optionally also be performed to improve image resolution in the z-direction. After the data has been deconvolved, an inverse Fourier transform processor 64 transforms the data from the frequency domain back into real space. Optionally, a three-dimensional memory 66 stores the resolution recovered sets of projection data. A reconstruction processor 68 reconstructs the projection data sets, using filtered back-projection, iterative reconstruction, or other techniques which are well-known in the art, and stores the resultant image in a three-dimensional image memory 70. A video processor 72 withdraws selected portions of the reconstructed image and converts it to appropriate format for display on a human-readable monitor 74, such as a video monitor, CCD display, active matrix, or the like. The video processor may withdraw selected slices, three-dimensional renderings, projection views, or the like.

In one alternate embodiment, the movable gantry 22 rotates the detector heads continuously. Although the detector heads rotate continuously, the data acquisition system 30 bins the collected data into regular angular intervals, e.g., 3°. Because the data is collected over 3° of rotation, there is an additional blurring component. As described in greater detail below, the stationary deconvolution processor 62 deconvolves the Fourier space data with respect to the blurring caused by the continuous motion and treats data collected over a few degrees as if it were all collected at precisely the same angle.

Figure 3:
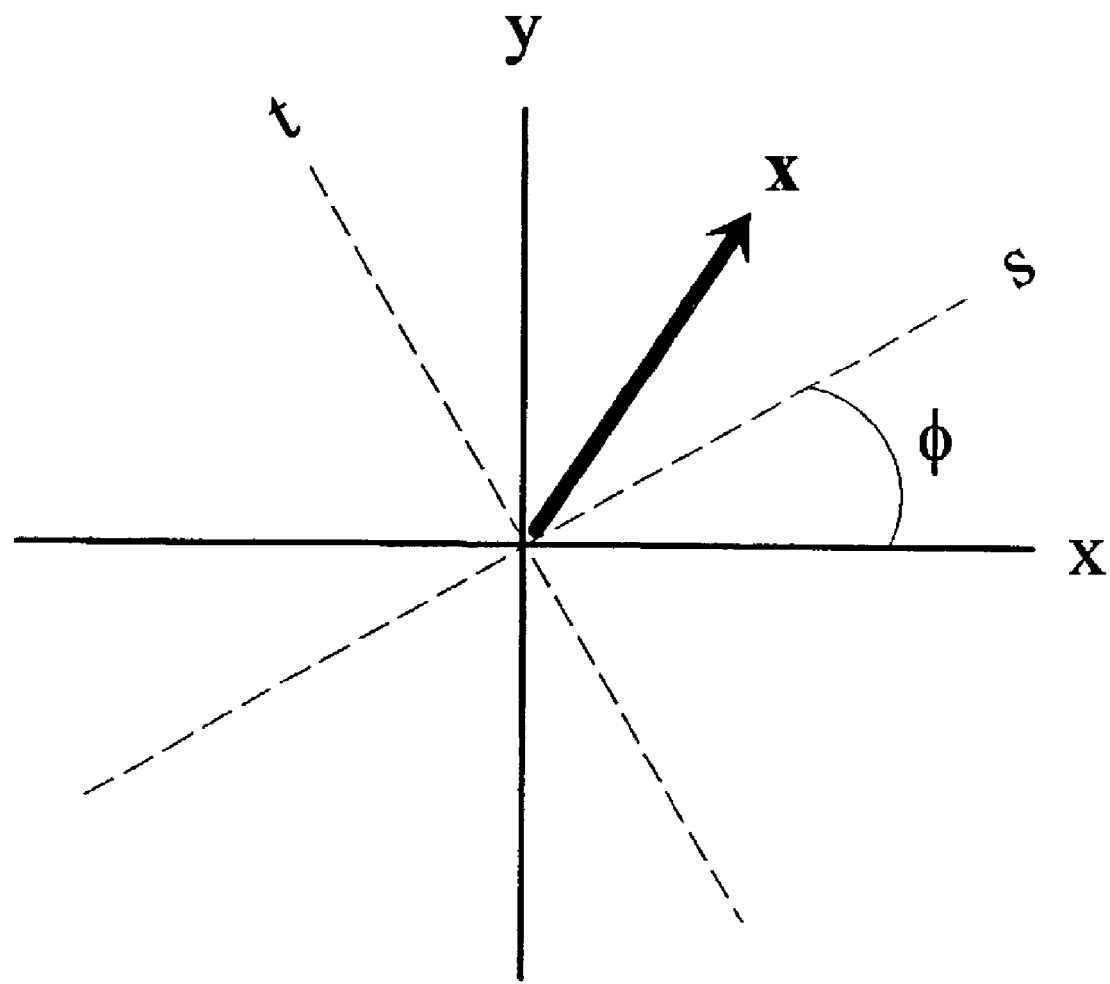
FIG. 3 shows the coordinate system used in data acquisition and image reconstruction.

With reference to FIG. 3, and looking now to details of the resolution recovery system, the working principles are explained in two-dimensions and circular orbits, but the generalization to three-dimensions is straightforward and generalization to non-circular orbits is known to those conversed in the art. The third dimension, z, is perpendicular to the plane defined by the x-y axes. The scanner collects data in coordinates (s, $\phi$) which are the sinogram coordinates of the Radon transform coordinates. The unblurred or undegraded Radon transform of the object o is the line integral along t, the axis perpendicular to s. In a nuclear medicine tomographic device, the object o is blurred by a point response function g. This process is modeled by a convolution in s. The amount of blurring depends on the depth t. Hence, the blurring function is a non-stationary convolution of o with g. The result is the blurred Radon transform p. For limited-angle tomography, this operation of the scanner is represented by:

$$p(s, \phi) = \int_{-\infty}^{\infty}\int_{-\infty}^{\infty} g(s-s', t)o(s'\theta + t\theta^{\perp})ds'dt, \qquad (1)$$

where $\theta$ and $\theta^{\perp}$ are two-dimensional unit vectors aligned with the (s,t) axes:

$$\theta: [\cos \phi, \sin \phi] \text{ and } \theta^{\perp}: [-\sin \phi, \cos \phi] \qquad (2).$$

A point source located at x in the object will have the point-source projection:

$$p_{\delta} = \int_{-\infty}^{\infty}\int_{-\infty}^{\infty} g(s-s', t)|J|\delta(s' - x\cdot\theta, t - x\cdot\theta^{\perp})ds'dt \qquad (3)$$
$$= g(s - x\cdot\theta, x\cdot\theta^{\perp}),$$

where |J| is the Jacobian of the change of coordinates from (x,y) to (s,t) and is equal to one because it is a rotation. The two-dimensional Fourier transform of Equation (3) gives:

$$\hat{p}_{\delta}(\omega, n) = \int_{0}^{2\pi} e^{-in\phi}\int_{-\infty}^{\infty} e^{-i\omega s}g(s - x\cdot\theta, x\cdot\theta^{\perp})dsd\phi \qquad (4)$$
$$= \int_{0}^{2\pi} e^{-in\phi}e^{-i\omega x\cdot\theta}\hat{g}(\omega, x\cdot\theta^{\perp})d\phi \approx \hat{g}\left(\omega, x\cdot\theta^{\perp} = \frac{n}{\omega}\right).$$

The $\phi$-integral is evaluated using the principle of stationary phase, an approximation process familiar to those knowledgeable in the art, which asymptotically converges to the exact value of the $\hat{p}_{\delta}$ integral at high frequencies. In Equation (4), it will be noted that the solution does not depend on the location of the point source. Hence, it can be applied to any point source or a weighted collection of point sources.

Furthermore, if the scanning arc is limited to something less than 360° or 2π radians, the basic result of stationary phase, that the distance t is given by:

$$t = x \cdot \theta^{\perp} = \frac{n}{\omega} \tag{5}$$

is unchanged, because every distance is represented in each planar projection image. This enables the limits of integration in Equation (4) to be replaced with an arc or a series of disjoint arcs and Equation (5) still holds to good approximation.

In operation, the digitized three-dimensional data set $p(s_j, z_k, \phi_m)$ is collected. The digitization assumes equal increments in each coordinate sample space. For example, the angular increment m is taken at intervals $\phi_m = 2\pi m/N$ radians, where N is an integer.

The depth dependent, point response function g(s,z,t) is obtained. When the scan is over a limited angle arc described by the interval $[\phi_u, \phi_v]$ a digital input data set is formed according to the following process:

$$p_{in}(s_j, z_k, \phi_W) = \begin{cases} 0, & \text{for } 0 \le W < \min(u, v) \\ \frac{1}{2} p(s_j, z_k, \phi_u), & \text{for } W = u \\ p(s_j, z_k, \phi_W) & \text{for } u < W < v \\ \frac{1}{2} p(s_j, z_k, \phi_v), & \text{for } W = v \\ 0, & \text{for } \max(u, v) < W < N. \end{cases} \tag{6}$$

The endpoint projection frames are multiplied by one-half to prevent excessive ringing or Gibbs' phenomena. Other smoothing functions for smoothing the sudden data discontinuity are also contemplated. The Fourier transform with respect to angle is selected to have dimension N, no more and no less, to preserve the cyclic nature of the data. The three-dimensional Fourier transform applied by the Fourier transform processor 60 of the modified projection data $p_{in}$ is denoted by:

$$\hat{p}_{in}(\omega_s, \omega_z, n) \tag{7}$$

The filter function:

$$\hat{g}\left(\omega_s, \omega_z, \frac{n}{\omega_s}\right) \tag{8}$$

is defined The filter function is used in a regularized inverse filter such as a noise reduction filter or a Metz filter to perform the stationary deconvolution 62. The inverse Fourier transform processor 64 takes the inverse Fourier transform of the filtered image to obtain projection data that possesses improved resolution.

In the continuous scanning embodiment, the camera moves according to a preprogrammed orbit. In the preferred embodiment, the three heads move simultaneously in a complex patient dependent orbit. Continuous motion is advantageous for reducing motion complexity. However, continuous scanning degrades resolution. Preferably, the stationary deconvolution module includes a component to compensate for this degraded resolution.

Continuous scan projection data $p_c$ is related to the step-and-shoot projection data p by:

$$p_c(s, z, \phi) = \frac{1}{\Delta \phi} \int_{-\Delta \phi/2}^{\Delta \phi/2} p(s, z, \phi') d\phi'. \tag{9}$$

The Fourier transform relationship is:

$$\hat{p}_c(\omega_s, \omega_z, n) = \hat{p}(\omega_s, \omega_z, n) \frac{\sin(n\Delta \phi/2)}{n\Delta \phi/2}, -\frac{N}{2} + 1 \le n \le \frac{N}{2}. \tag{10}$$

These relationships hold true for non-circular and limited-angle orbits as well. The filter function for continuous sampling $\hat{g}_c$, is modified to include the weighted sine function from Equation (10):

$$\hat{g}_c\left(\omega_s, \omega_z, \frac{n}{\omega_s}\right) = \frac{\sin(n\Delta \phi/2)}{n\Delta \phi/2} \hat{g}\left(\omega_s, \omega_z, \frac{n}{\omega_s}\right). \tag{11}$$

In accordance with another alternate embodiment, in the step-and-shoot imaging mode, the actually collected data integrals may be disjoint. It is not necessary for all of the angular views to be adjacent as in the example above.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of diagnostic imaging comprising:
   collecting a plurality of projection data sets corresponding to each of a plurality of angles around a subject, projection data sets being collected over less than 360°;
   operating on the projection data sets with a resolution recovery algorithm; and
   reconstructing the resolution recovered projection data sets into an image representation.

2. A method of diagnostic imaging comprising:
   collecting a plurality of projection data sets corresponding to each of a plurality of angles spanning 204° around a subject;
   performing a resolution recovery process on the projection data sets; and
   reconstructing the resolution recovered projection data sets into an image representation.

3. A method of diagnostic imaging comprising:
   collecting a plurality of projection data sets corresponding to each of a plurality of angles around a subject spanning less than 360°;
   performing a resolution recovery process in at least an angular rotation dimension, the resolution recovery process including:
      zero-filling projection image data sets in the angular rotation direction, such that the zero-filled and actually collected projection data sets together span 360° at regular angular increments.

4. The method as set forth in claim 3, further including:
smoothing an interface between the actually collected and zero-filled data sets.

5. The method as set forth in claim 4 further including:
transforming the smoothed data sets into frequency space;
stationarily deconvolving the frequency space data sets with a resolution recovery filter function; and
transforming the stationarily deconvolved data sets from frequency space to image space.

6. The method as set forth in claim 5 further including:
rotating detector heads continuously around the subject;
binning projection data collected over preselected angular increments into the projection data sets; and
in the deconvolving step, deconvolving the frequency space data sets with:

$$\frac{\sin(n\Delta\phi/2)}{n\Delta\phi/2}\hat{g}\left(\omega_s, \omega_z, \frac{n}{\omega_s}\right)$$

where $\Delta\phi$ is the angular increment corresponding to each data set, and $\hat{g}(\omega_s, \omega_z, n/\omega_s)$ is the resolution recovery filter function.

7. The method as set forth in claim 4 wherein the smoothing step includes:
reducing an amplitude of at least one actually collected projection data set adjacent each zero-filled data set.

8. The method as set forth in claim 7 wherein the reduction in amplitude is one-half for each value of the original actually collected projection data set adjacent each zero-filled data set.

9. The method as set forth in claim 7 wherein the actually collected data is disjoint with at least four interfaces between the actually collected and zero-filled data sets.

10. The method as set forth in claim 4 wherein the step of transforming into frequency space includes:
operating with a Fourier transform which is matched to a total of the actually collected and zero-filled data sets.

11. A method of diagnostic imaging comprising:
moving a detector head in an orbit about a subject in an examination region;
collecting data during the orbit and organizing the data in a plurality of projection data sets corresponding to each of a plurality of angular increments around a subject;
performing an electronic resolution recovery process on the projection data sets; and
reconstructing the resolution recovered projection data sets into an image representation.

12. The method as set forth in claim 1 wherein the collecting step includes:
continuously moving a gantry which moves a detector head in a continuous angular orbit about a subject in an examination region; and
collecting data during the continuous orbit and sorting the data into a plurality of projection data sets corresponding to each of a plurality of angular increments around a subject.

13. The method of claim 11 wherein the angular increments are spaced by less than 7°.

14. The method as set forth in claim 11 wherein the projection data sets span less than 360°.

15. The method of claim 11 wherein the angular increments are spaced by 3°.

16. The method of claim 11 wherein the resolution recovery process includes correcting for blurring due to the continuous rotation.

17. A method of diagnostic imaging comprising:
moving a detector head in an orbit around a subject in an examination region;
collecting data during the orbit and organizing the data in a plurality of projection data sets corresponding to each of a plurality of angular increments around a subject;
performing a resolution recovery process on the projection data sets the resolution recovery process including:
transforming the data sets into frequency space;
performing a stationary deconvolution on the frequency space data sets with a filter, the filter used in performing the stationary deconvolution being $$\frac{\sin(n\Delta\phi/2)}{n\Delta\phi/2}\hat{g}\left(\omega_s, \omega_z, \frac{n}{\omega_s}\right)$$

where $\Delta\phi$ is the angular increment over which the data is collected in each data set, and $\hat{g}(\omega_s, \omega_z, n/\omega_s)$ is a filter function for projection data collected only at the angular increments; and
transforming the stationarily deconvolved data sets from frequency space to image space; and
reconstructing the resolution recovered projection data sets into an image representation.

18. A method of diagnostic imaging comprising:
moving a detector head in an orbit spanning less than 360° about a subject in an examination region;
collecting data during the orbit and organizing the data in a plurality of projection data sets corresponding to each of a plurality of angular increments around a subject;
performing a resolution recovery process on the projection data sets, the resolution recovery process including:
zero-filling projection data sets in the angular rotation direction, the zero-filled and actually collected projection data sets together spanning 360°; and
smoothing each interface between the actually collected and zero-filled data sets, the smoothed data sets being transformed into frequency space; and
reconstructing the resolution recovered projection data sets into an image representation.

19. The method as set forth in claim 11, wherein:
the moving step includes rotating the detector head continuously along the orbit; and
the collecting step includes collecting data continuously during rotation of the detector head along the orbit and sorting the collected data into data sets which correspond to angular increments of the continuous rotation.

20. The method as set forth in claim 11, wherein:
the moving means moves the detector head in a step and shoot mode in which the detector head is rotated to each of a plurality of preselected locations along the orbit and stopped; and
the collecting step includes collecting data when the detector head is stopped at each of the preselected locations, each of the plurality of projection data sets corresponding to one of the preselected stopped locations.

21. A diagnostic imaging apparatus comprising:
a means for collecting a plurality of projection data sets corresponding to each of a plurality of angles around a subject, the projection data sets being collected over less than 360°;
a processor for operating on the projection data sets with a resolution recovery algorithm; and a means for reconstructing the resolution recovered projection data sets into an image representation.

22. An apparatus for diagnostic imaging comprising:
a means for moving a detector head in an orbit around a subject in an examination region;
a means for collecting data during the orbit and organizing the data in a plurality of projection data sets corresponding to each of a plurality of angular increments around a subject;
an electronic processor for performing an electronic resolution recovery process on the collected projection data sets; and
a means for reconstructing the resolution recovered data projection sets into an image representation.

23. The apparatus as set forth in claim 22, wherein the moving means moves the detector head continuously around the subject, each of the plurality of projection data sets corresponding to data collected during an angular increment of the continuous rotation.

24. The apparatus as set forth in claim 22, wherein the moving means moves the detector head to each of a plurality of preselected positions around the orbit corresponding to each of the angular increments and stops the rotation while the data is collected, each of the projection data sets corresponding to one of the stopped positions of the detector head.

* * * * *